United States Patent
Chaudhuri (10) Patent No.: US 9,385,533 B2
(45) Date of Patent: Jul. 5, 2016

(54) POWER SYSTEM STABILIZATION

(71) Applicant: GENERAL ELECTRIC COMPANY, Schenectady, NY (US)

(72) Inventor: Nilanjan Ray Chaudhuri, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 513 days.

(21) Appl. No.: 13/905,415

(22) Filed: May 30, 2013

(65) Prior Publication Data

US 2014/0354062 A1     Dec. 4, 2014

(51) Int. Cl.
*H02J 3/24*       (2006.01)
*G05B 13/02*    (2006.01)

(52) U.S. Cl.
CPC ............. *H02J 3/24* (2013.01); *G05B 13/021* (2013.01)

(58) Field of Classification Search
CPC ............ H02J 3/24; H02J 3/06; G05B 13/021; Y02E 60/728
USPC ............................................. 307/102
See application file for complete search history.

(56) References Cited

U.S. PATENT DOCUMENTS

| | | | |
|---|---|---|---|
| 8,019,484 B2 | 9/2011 | Korba et al. | |
| 8,022,575 B2 | 9/2011 | Korba et al. | |
| 2010/0023179 A1* | 1/2010 | Korba | H02J 3/24 700/297 |
| 2010/0133915 A1 | 6/2010 | Asplund et al. | |
| 2011/0093124 A1* | 4/2011 | Berggren | H02J 3/06 700/286 |
| 2011/0126038 A1* | 5/2011 | Korba | H02J 3/24 713/401 |
| 2012/0200166 A1* | 8/2012 | Berggren | H02J 3/24 307/102 |
| 2013/0054035 A1* | 2/2013 | Berggren | H02J 3/24 700/286 |
| 2013/0234680 A1* | 9/2013 | Kolwalkar | H02P 9/105 322/58 |

FOREIGN PATENT DOCUMENTS

| | | |
|---|---|---|
| WO | 2011033044 A2 | 3/2011 |
| WO | 2011061153 A2 | 5/2011 |
| WO | 2012041543 A1 | 4/2012 |

OTHER PUBLICATIONS

Chaudhuri et al. "Wide-area power oscillation damping control in Nordic equivalent system".*
European Search Report and Written Opinion issued in connection with corresponding EP Application No. 14168845.7-1804 dated Mar. 11, 2015.

(Continued)

*Primary Examiner* — Rexford Barnie
*Assistant Examiner* — Rasem Mourad
(74) *Attorney, Agent, or Firm* — Nitin N. Joshi (57) ABSTRACT

A system for damping power system oscillation includes a damping device controller for generating a damping control signal to compensate for a plurality of oscillation modes in the power system oscillations and a damping device to generate a damping signal based on a damping control signal. The damping device controller includes a plurality of outer closed loop paths each including an adaptive controller configured to determine an individual oscillation mode from at least one power system measurement signal. Each adaptive controller is further configured to generate an adaptive control signal to shift at least one open loop pole of an inner loop path related to the individual oscillation mode to a closed loop location.

18 Claims, 5 Drawing Sheets

(56) References Cited

OTHER PUBLICATIONS

Chaudhuri et al., "Application of Multiple-Model Adaptive Control Strategy for Robust Damping of Interarea Oscillations in Power System", IEEE Transactions on Control Systems Technology, vol. No. 12, Issue No. 5, pp. 727-736, Sep. 1, 2004.

Sadikovic et al., "Application of FACTS devices for damping of power system oscillations", Power Tech, pp. 1-6, Jun. 27, 2005.

R. Sadikovic et al., "Self-tuning Controller for Damping of Power System Oscillations with FACTS Devices," IEEE, pp. 1-6, ISBN: 1-4244-0493-2, 2006.

N.R. Chaudhuri et al., "Wide-area power oscillation damping control in Nordic equivalent system," IET Journals, IET Generation, Transmission & Distribution, vol. 4, Issue 10, pp. 1139-1150, Feb. 8, 2010.

O.P. Malik et al., "Adaptive self-optimising pole shifting control algorithm," IEEE Proceedings-D, vol. 139, No. 5, pp. 429-438, Sep. 1992.

S. Cheng et al., "An Adaptive Synchronous Machine Stabilizer," IEEE Transactions on Power Systems, vol. PWRS-1, No. 3, pp. 101-107, Aug. 1986.

* cited by examiner

POWER SYSTEM STABILIZATION

BACKGROUND

Embodiments of the present invention relate generally to a power flow in a power system. More specifically, the embodiments relate to damping of power system oscillations.

The power system is a complex network comprising of numerous generators, transmission lines, a variety of loads and transformers. With increasing power demand in the power system, some transmission lines are more stressed than was planned when they were built. Since stressed conditions can lead a system to unstable conditions, power system stability has become an important issue. In simple terms, power system stability is defined as the ability of the power system to return to a normal state after a disturbance. The disturbance may be a fault, a loss of a generator or even a sudden increase in power loading which results in power oscillations in power system.

Small signal stability is a power system stability issue related to low frequency oscillations between generator rotors. It has been the main reason for many power blackouts across the world including the Western Electricity Co-ordination Council (WECC) blackout of 1996. When the power system is heavily loaded, it often exhibits multi-mode oscillations because machine rotors, behaving as rigid bodies, oscillate with respect to one another using the electrical transmission lines between them to exchange energy. These oscillations generally lie in a frequency range between 0.1-3 Hz. The oscillations in this frequency range are generally analyzed in two main oscillation modes: 1) a local mode in the range of 1 to 3 Hz i.e., a generator or a group of generators in a plant swinging against the rest of the system and 2) an inter area mode in the range of 0.1 to 1 Hz i.e., machines in one group oscillate against machines in another group.

To stabilize the power system, damping measures to damp the power oscillations are utilized. Power system stabilizers (PSSs) are the most common damping control devices in power systems. Apart from PSSs, power oscillation damping (POD) can be effectively achieved through supplementary control of Flexible AC Transmission Systems (FACTS) devices installed in key transmission corridors. Traditionally, classical control theory has been adopted for design of such controllers which require an accurate model of the system at a particular (nominal) operating condition. However, lack of availability of accurate and updated information about each and every dynamic component of a large inter-connected system and its ever changing nature often puts a fundamental challenge on such model based approaches. Indirect adaptive controllers, which rely solely on system measurements, are useful for power system stabilizers (PSS) and also for the FACTS devices. These controllers are updated online based on the estimated model of the system and thus can adapt to the changes in operating conditions. However, present architectures of indirect adaptive controllers utilize complex multi-input multi-output (MIMO) structure. This leads to a multi-variable controller, which is very complicated in nature.

For these and other reasons, there is a need for an improved indirect adaptive controller for power oscillation damping.

BRIEF DESCRIPTION

In accordance with an embodiment of the present technique, a system for damping power system oscillations is provided. The system includes a damping device controller to generate a damping control signal to compensate for a plurality of oscillation modes in the power system oscillations. The damping device controller includes a plurality of outer closed loop paths each including an adaptive controller configured to determine an individual oscillation mode from at least one power system measurement signal. Each adaptive controller is further configured to generate an adaptive control signal to shift at least one open loop pole of an inner loop path related to the individual oscillation mode to a closed loop location. The system further includes a damping device to generate a damping signal based on the damping control signal.

In accordance with another embodiment of the present technique, a method of damping power system oscillations in a power system network is provided. The method includes obtaining a plurality of power system measurement signals from a plurality of power system locations and generating a damping control signal to compensate for a plurality of oscillation modes in the power system oscillations. In the method, generating the damping control signal includes extracting an individual oscillation mode from each of the power system measurement signals generating a plurality of adaptive control signals to shift open loop poles related to the individual oscillation modes to a closed loop location. The method further includes injecting a damping signal in the power system network based on the control signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As used herein, the term "controller" refers to software, hardware, or firmware, or any combination of these, or any system, process, or functionality that performs or facilitates the processes described herein.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
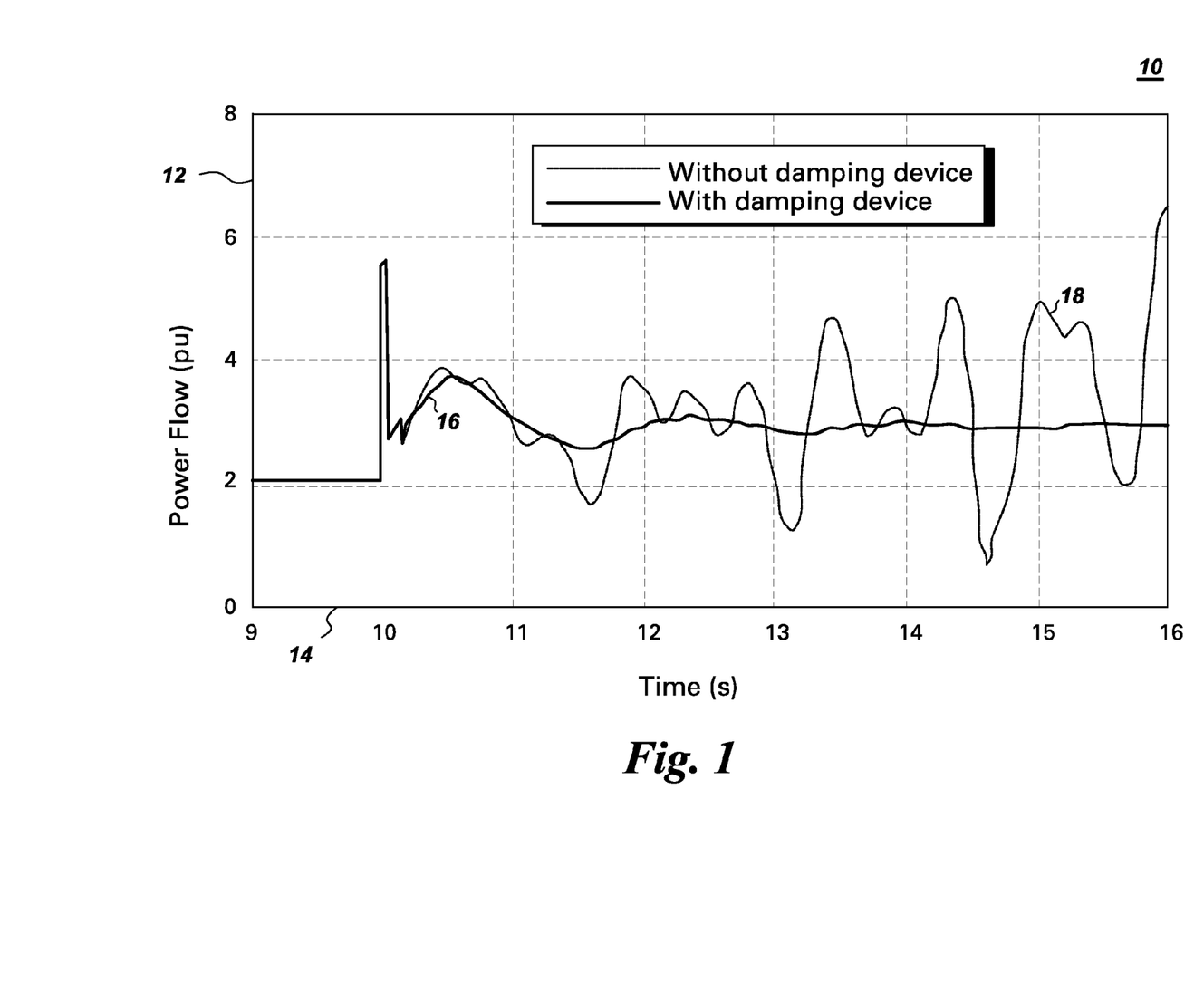
FIG. 1 is a graphical representation of exemplary power oscillations in a power system.

FIG. 1 shows a graphical plot 10 of exemplary power oscillations in a power system. A horizontal axis 14 represents time in seconds whereas a vertical axis 12 represents power flow in a transmission line in per unit (pu). A curve 18 shows power oscillations in the transmission line power flow without a damping controller. Even though only power oscillations are shown here, it should be noted that the oscillations may be present in any other signal such as a voltage or a current or even a generator rotor speed. A power demand on the transmission line gets changed from 2 pu to around 3 pu at 10 seconds. At this transition, power oscillations in curve 18 starts and they increase slowly in amplitude. If these oscillations are not damped, the respective power network may become unstable and may result in a power blackout.

A curve 16 shows power oscillations in the transmission line power flow with a damping device such as an AVR or a FACTS device. As can be seen, when a damping controller is used along with the damping device, the power oscillations attenuate quickly, and the power flow settles down to meet the new demand in around 16 seconds. A spike around 10 seconds is the result of damping controller parameters and depends on a damping controller gain value. Also based on Fourier series principles, it can be seen that curve 18 may be split into multiple oscillation modes or sinusoidal components of different frequencies. Sinusoidal signals have a property that if two signals 180 degrees out of phase are added, the resultant signal amplitude becomes zero. In control theory the sinusoidal signal may be represented in terms of a eigenvalue $\lambda$, which may be given as:

$$\lambda = \sigma \pm j\omega_d \quad (1)$$

where $\sigma$ may be referred as a damping ratio and $\omega_d$ may be referred as damping natural frequency which describes how oscillations in the system decay after a disturbance. However, determining exact values of $\sigma$ and $\omega_d$ may not be feasible. Thus, in one embodiment, a closed loop system is employed which determines approximate factors $\sigma$ and $\omega_d$ so as to minimize an oscillation signal or an oscillation mode.

Figure 2:
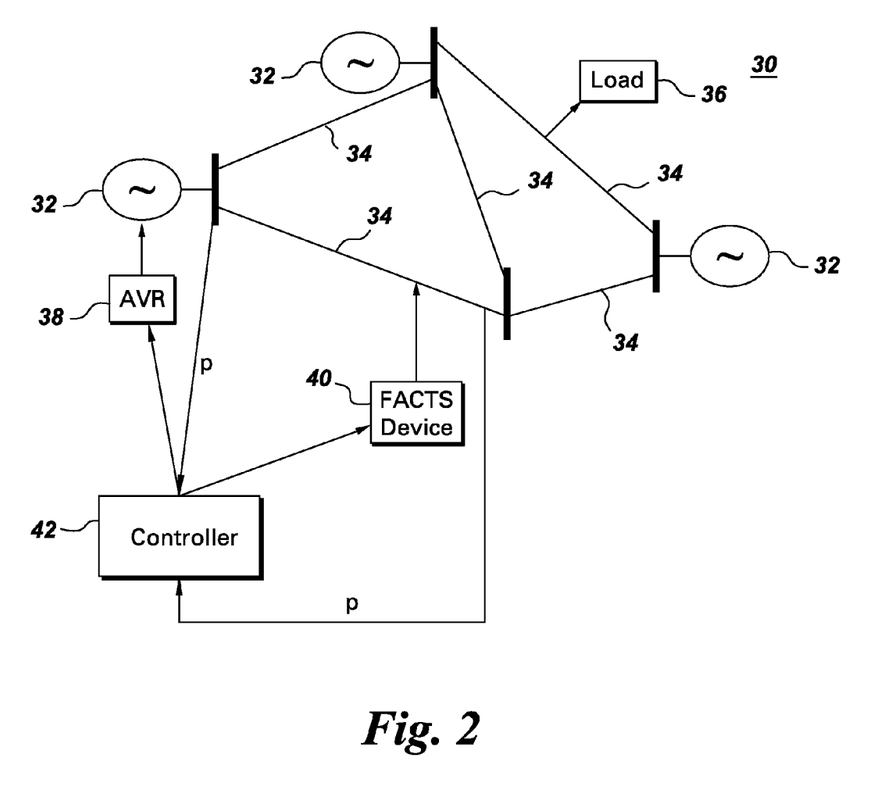
FIG. 2 is a schematic diagram of a power system illustrating a system for damping power system oscillations in accordance with an embodiment of the present technique.

FIG. 2 shows a power system 30 illustrating a system for damping oscillations in accordance with an embodiment of the present invention. Power system 30 includes generators 32, transmission lines 34, and load 36. Power system 30 further includes damping devices such as AVR 38 or FACTS device 40. AVR 38 can damp power system oscillations by controlling the excitation of generator 32 and thus, by controlling power flow from the generator based on an input from a damping controller 42. In other embodiments, each of the generators 32 has an automatic voltage regulator (AVR) controlled by damping controller 42. Similarly, FACTS device 40 can damp power system oscillations by either injecting or absorbing appropriate active and reactive power from the power system 30 based on an input from damping controller 42. Further, damping devices may be used for other purposes apart from damping the oscillations. For example, the AVR may be used to control a generator output voltage, but when a power system stabilizer (PSS) is used it will also serve the function of the damping device.

Damping controller 42 receives measurement signals such as voltage or power signals at a point at which generator 32 or FACTS device 40 is connected to transmission line 34. It should be noted that even though damping controller 42 is shown as a central controller, in other embodiments a separate controller or a local controller may be used for AVR 38 and FACTS device 40. Damping controller 42 extracts signal components of different frequencies from the input signal and provides appropriate control signals to AVR 38 and FACTS device 40 to cancel out the extracted frequency components. In one embodiment, FACTS device 40 and AVR 38 may have their individual controllers (not shown) designed for a different purpose such as for reactive power compensation or voltage compensation and output from damping controller 42 is added to reference signals of the those individual controllers. Thus, the individual controller in addition to its main purpose also acts on command from damping controller 42 to damp the measurement signal oscillations.

Figure 3:
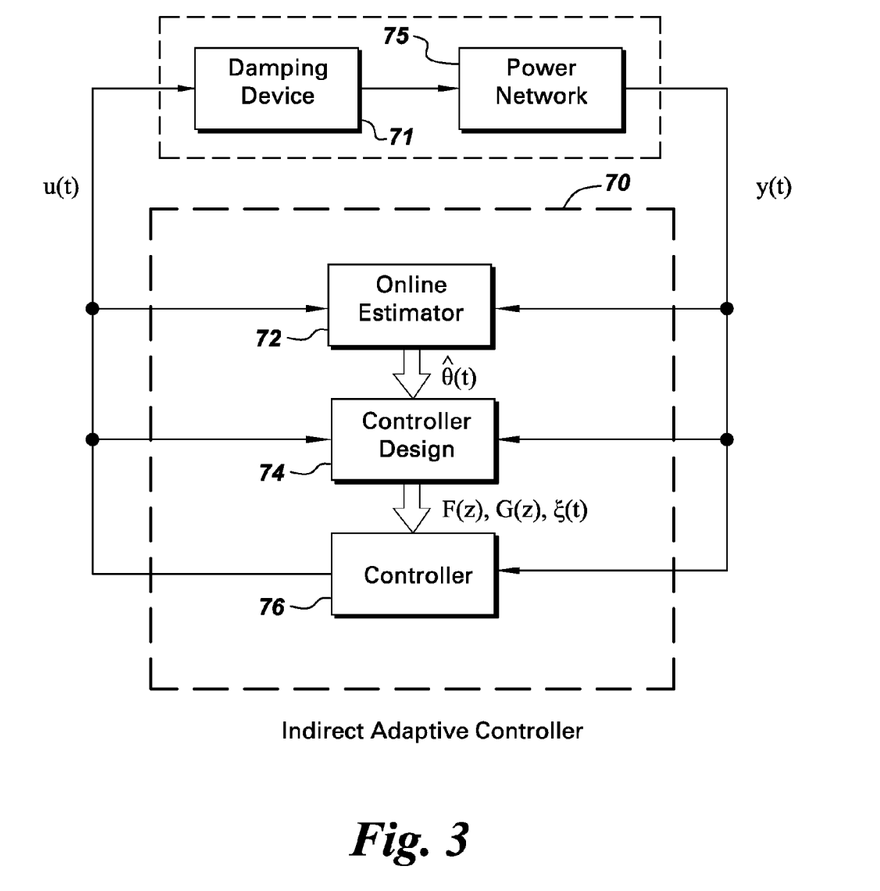
FIG. 3 is a block diagram of an indirect adaptive controller for power oscillation damping (IACPOD)

FIG. 3 shows a block diagram of an indirect adaptive controller for power oscillation damping (IACPOD) 70. IACPOD 70 is utilized to generate a control signal u(t) for a damping device 71 based on an output signal y(t) of a power network 75. IACPOD 70 may be employed in controller 42 of FIG. 1. IACPOD 70 includes an online estimator 72, a controller design module 74 for determining controller parameters for a controller module 76. Online estimator 72 estimates oscillation modes information in a power system comprising power network 75 and damping device 71, based on which controller design module 74 determines the controller parameters for controller module 76. Thus, the controller parameters are not updated directly, rather indirectly via the estimation of the system dynamics. This results in an indirect adaptive algorithm of IACPOD 70.

Online estimator 72 includes a system model which estimates an output of a power system including the FACTs devices based on an input signal which may be a voltage signal, a current signal, a power signal or a speed signal, for example. In one embodiment, the system model may include an auto regressive moving average (ARMA) model. In one embodiment, a power system model output may be represented as:

$$y(t) = -\sum_{i=1}^{n_a} a_i y(t-i) + \sum_{i=1}^{n_b} b_i v(t-k-i) + e(t) \quad (2)$$

where y(t) and y(t−i) are output signals of the system model at a sample time t and (t−i) respectively, v(t−k−i) is an input signal to the model at time (t−k−i), e(t) is a zero mean random noise with a Gaussian distribution, $a_i$ and $b_i$ are auto regressive (AR) coefficients and $n_a$ and $n_b$ are orders of a numerator and denominator polynomial of the power system model transfer function respectively. The output signal y(t) includes various electromechanical modes of power system oscillation. It should be noted that the above system model equation is in time domain and in z-domain, the equation may be represented as:

$$A(z)Y(z) = z^{-k}B(z)V(z) + E(z) \quad (3)$$

where, $A(z) = 1 + \sum_{i=1}^{n_a} a_i z^{-i}$ and $B(z) = \sum_{i=1}^{n_b} b_i z^{-i}$ which represent a transfer function of the power system model in z domain as B(z)/A(z). Individual oscillation modes or related poles from the power system model then may be extracted by determining roots of the equation A(z)=0. It should be noted that the power system model may be a very high order model i.e., the value of $n_a$ or number of poles in the power system model may be very high. However, since the objective is to determine small signal oscillations in the range of about 1 to about 3 Hz, in an embodiment, only $3^{rd}$ order power system model (i.e., $n_a = 3$) may be utilized.

In general, at every sample, a predicted output $\hat{y}(t)$ of system model is determined which in an embodiment is given as:

$$\hat{y}(t) = X^T(t)\hat{\theta}(t-1) \quad (4)$$

where X(t) is a regressor comprising past input and output samples, i.e., $X(t) = [-y(t-1), \ldots -y(t-n_a), u(t-1), \ldots u(t-n_b)]^T$ and $\hat{\theta}(t-1)$ is a parameter vector at a previous sample i.e., at time (t−1) comprising ARMA coefficients or system parameters, i.e., $\hat{\theta} = [\hat{a}_0, \hat{a}_1, \ldots \hat{a}_{n_a}, \hat{b}_0, \hat{b}_1, \ldots, \hat{b}_{n_b}]^T$ at any given time e.g., at (t−1) in the present instant. The parameter vector $\hat{\theta}$ is updated at every sample and is determined by:

$$\hat{\theta}(t) = \hat{\theta}(t-1) + K(t)\epsilon(t) \quad (5)$$

where $\epsilon(t)$ is a prediction error given by:

$$\epsilon(t) = y(t) - \hat{y}(t) \quad (6)$$

and K(t) is a gain vector given as:

$$K(t) = \frac{P(t-1)X(t)}{\lambda(t-1) + X^T(t)P(t-1)X(t)} \quad (7)$$

In equation (7) above, λ is a forgetting factor and P is a covariance matrix and at sample time equal to t are given as:

$$\lambda(t) = 1 - \frac{[1 - X^T(t-1)K(t)]}{\Sigma_0} \quad (8)$$

$$P(t) = \frac{[I - K(t)X^T(t)]P(t-1)}{\lambda(t)} \quad (9)$$

In an embodiment, $\Sigma_0$ is a constant with a value equal to 0.8. Thus, at every sample, the system model generates the predicted output ŷ(t) based on updated values in the regressor X(t) and the parameter vector θ̂(t) and based on the predicted output ŷ(t) inter-area oscillation modes of interest are detected. In an embodiment, inter-area oscillation modes may range from 0.1 Hz to 1.0 Hz and local-mode oscillation mode may range from 1.0 Hz to 3.0 Hz.

It should be noted that the appropriate identification of the oscillation mode of interest from the predicted output ŷ(t) depends on the choice of sampling frequency. The sampling time of sampling frequency may vary from 20 ms to 100 ms. In one embodiment of the present technique, a sampling time of 80 ms provided good results.

Referring back to FIG. 3, once the online estimator 72 determines the inter-area oscillation modes of interest, controller 76 provides an appropriate control signal u(t) to damp these inter-area oscillation modes. In an embodiment, controller 76 may include an adaptive controller and controller design module 74 utilizes a pole shifting control algorithm to compute the controller coefficients for controller 76. In one embodiment, a feedback control loop has the form:

$$U(z)F(z) = -Y(z)G(z) \quad (10)$$

where, $G(z) = \sum_{i=0}^{n_g} g_i z^{-i}$ and $F(z) = 1 + \sum_{i=1}^{n_f}(1 + f_i z^{-i})$. In one embodiment, control polynomials $n_g$ and $n_f$ are given as $n_g = n_b - 1$ and $n_f = n_a - 1$, where $n_a$ and $n_b$ are system polynomials as described earlier and $g_i$ and $f_i$ are control parameters that need to be determined. In general, the underlying design problem for the controller is to shift open-loop poles of the system (i.e., equation 2) radially by a pole shifting factor α towards a unit circle in a pole zero plot so that the closed loop characteristics equation assume the form:

$$A(z^{-1})F(z^{-1}) + B(z^{-1})G(z^{-1}) = A(\alpha z^{-1}) \quad (11)$$

The controller parameters are derived by controller design module 74 based on the equality equation 10. For example, let D be a matrix of control parameter $g_i$ and i.e., $D = [f_1, f_2, \ldots, f_{n_f}, g_0, g_1, \ldots, g_{n_g}]^T$, then D can be determined by solving above equality based on the value of the pole shifting factor α. The control signal u(t) which will compensate for the inter-area oscillation mode of the interest can then be expressed as:

$$u(t) = \xi^T(t) \cdot D \quad (12)$$

where $\xi^T(t) = [-u(t-1), \ldots, -u(t-n_f), -y(t), \ldots, -y(t-n_g)]^T$. In one embodiment, an optimization function based on a principle of a minimum variance (MV) regulator is used to determine an optimum value of pole shifting factor α. In this method, a system output in the next sample is predicted from the following equation:

$$\hat{y}(t+1) = \xi^T(t) \cdot \beta + b_1 u(t, \alpha) + e(t+1) \quad (13)$$

where $\beta = [-b_2, -b_3, b_{n_b}, a_1, a_2, \ldots, a_{n_a}]^T$. Thus, the optimization problem becomes $$\min_\alpha J(t+1, \alpha) = \min_\alpha E[\hat{y}(t+1) - y_r(t+1)]^2 \quad (14)$$

subject to constraints $-\frac{1}{\Lambda}(1-\sigma) < \alpha < \frac{1}{\Lambda}(1-\sigma)$ and $u_{min} < u(t, \alpha) < u_{max}$ where, as discussed above ŷ(t+1) is the expected output and $y_r(t+1)$ is a desired output at the next sampling instant. J(t+1, α) is an optimization function, Λ is the absolute value of the largest root of $A(z^{-1})$, σ is a security factor to account for the inaccuracy of the estimated parameters and $u_{min}$ and $u_{max}$ are the maximum and minimum limits of the damping device respectively. The constraints are utilized to guarantee the stability of the closed-loop system.

Thus, based on values of control parameters in vector D determined by controller design block 74, controller 76 generates a control signal which is provided to the damping device to generate the appropriate damping signal and therefore damp oscillations. In one embodiment, controller design block 74 samples and stacks the input/output data in vector ξ(t) at a smaller sampling interval as compared to the online estimator 72. For example, the sampling time for the controller design block 74 and controller 76 is designed to be 20 ms, thereby enabling the controller 76 to generate control input with more recent information about the system, Whereas the same set of model parameters as identified by the estimator 72 are used to generate u(t) till the next set of updated parameters that are available at an interval of 80 ms.

Figure 4:
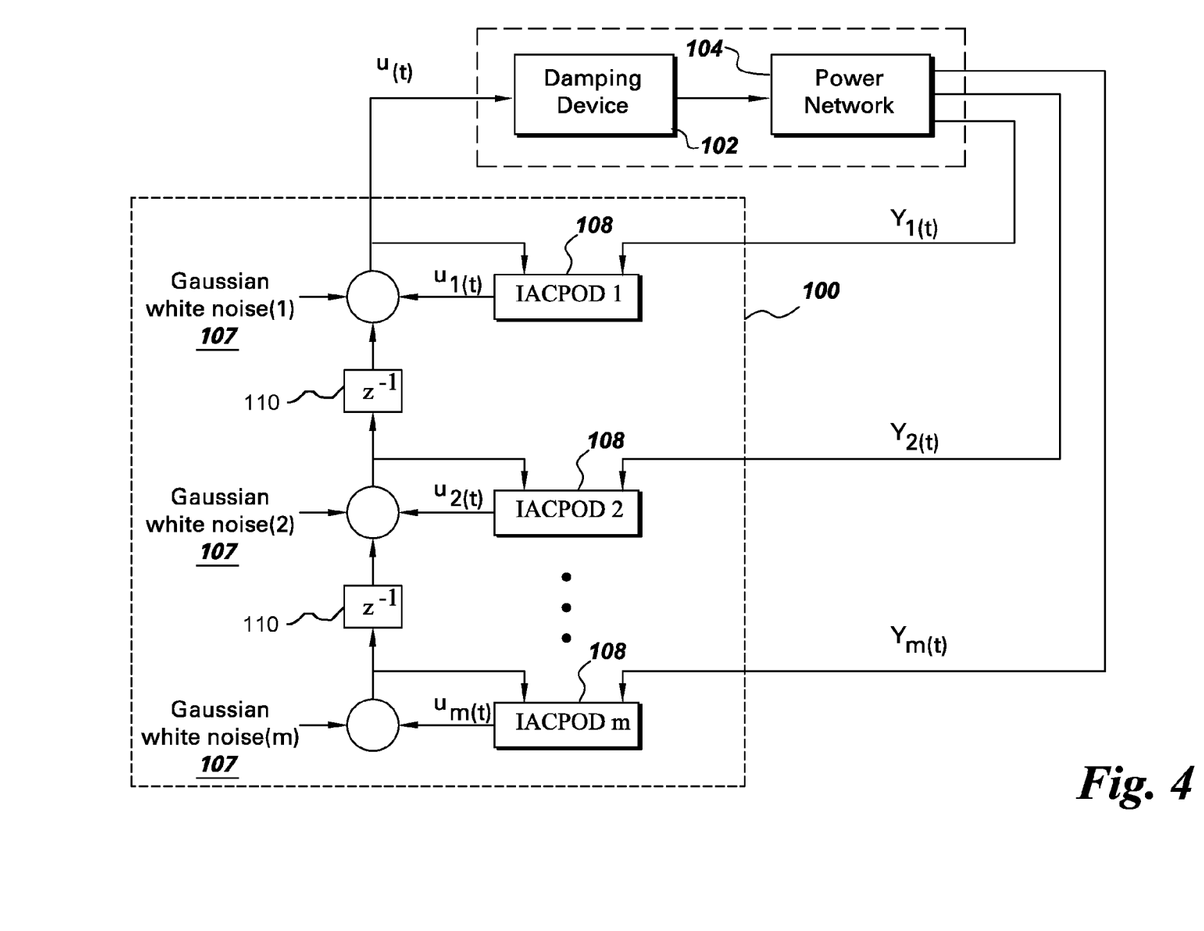
FIG. 4 is a block diagram of a damping controller for damping power system oscillations in accordance with an embodiment of the present technique.

FIG. 4 shows a block diagram of a damping controller 100 for damping power system oscillations in accordance with an embodiment of the present technique. Damping controller 100 is utilized with a damping device 102 which injects damping signals into a power network 104 for damping power oscillations in power network 104. Damping controller 100 further determines various power oscillation modes in power network 104 and provides a damping control signal to damping device 102 to damp the power oscillation modes.

Damping controller 100 receives a plurality of feedback signals $y_1(t), y_2(t), \ldots, y_m(t)$ and includes a plurality of adaptive controllers or IACPODs 108 for each of those plurality of feedback signals. The plurality of feedback signals may be local power system measurement signals, remote power system measurement signals or combinations thereof. Each of IACPODs 108 has a structure similar to that of IACPOD 70 of FIG. 3. However, IACPOD 70 (FIG. 3) utilizes a single feedback input from power network 75 to determine all oscillation modes in the power network and generates a single control signal that tries to compensate for all those oscillation modes. On the contrary, each of IACPOD 108 in FIG. 4 forms an outer closed loop path and determines an individual oscillation mode from an appropriate feedback signal. In one embodiment, the feedback signal selection is done based on the dominance of the oscillation modes present in the feedback signal. In one embodiment, a residue magnitude-angle method may be used offline to select the appropriate feedback signal. IACPOD 108 further provides an adaptive control signal to compensate for that specific oscillation mode by shifting an open loop pole of its inner loop path related to the individual oscillation mode to a closed loop location. In other words, damping controller 100 of FIG. 4 includes a multiple Single-input Single output (multi SISO) IACPODs. The number of IADPODs 108 that are used in damping controller 100 depends on number oscillation modes that need to be compensated.

In damping controller 100, each IACPOD 108 first determines and then shifts an open-loop pole of the power system comprising power network 104 and damping device 102 to a desired closed loop location. In one embodiment, a third-order system model is used in each IACPOD 108 which provides a damping control signal based on at least one feedback signal y(t) from power network 104 and at least one control signal $u_m(t)$ from damping controller 100 superimposed with a Gaussian white noise 107 to produce a control signal u(m−1) and achieves a desired damping ratio one at a time. Every outer loop with the IACPOD 108 identifies an open loop system with one poorly damped pole already shifted by previous IACPOD. In other words, every additional outer loop with one IACPOD 108 identifies and shifts another poorly-damped mode and thus, multiple modes are damped together by damping controller 100. In one embodiment, damping control signals $u_1(t), u_2(t), \ldots, u_m(t)$ generated by IACPODs 108 are time delayed by a time sample with respect to one another to provide an individual control action in case simultaneous control actions to damp oscillations are not desired. In one embodiment, a plurality of delay blocks 110 is utilized to delay the damping control signals. In one embodiment, a time delay involved to delay the damping control signals is equal to the sampling interval of the controller. Finally, the damping control signal u(t) that is provided to damping device 102 is an addition of all delayed control actions $u_1(t), u_2(t), \ldots, u_m(t)$ and Gaussian white noises 107.

Figure 5:
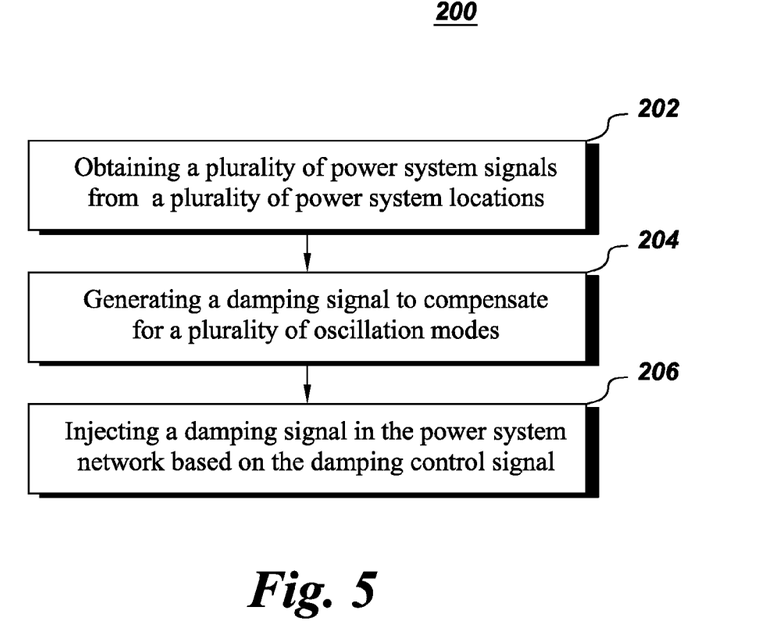
FIG. 5 is a flow chart illustrating a method of damping power system oscillations in accordance with an embodiment of the present technique.

FIG. 5 shows a method 200 of damping power system oscillations in accordance with an embodiment of the present technique. Method 200 includes obtaining a plurality of power system measurement signals from a plurality of power system locations in step 202. The plurality of power system measurement signals may be local or remote or combinations thereof. In step 204, the method 200 includes generating a damping control signal to compensate for a plurality of oscillation modes in the power system oscillations. Furthermore, generating the damping control signal comprises extracting an individual oscillation mode from each of the power system measurement signals for a plurality of oscillation modes in the power system oscillations and generating a plurality of adaptive control signals to shift open loop poles related to the individual oscillation modes to a closed loop location. Finally, in step 206, method 200 includes injecting a damping signal in the power system network based on the damping control signal.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for damping power system oscillations comprising:
a damping device controller to generate a damping control signal to compensate for a plurality of oscillation modes in the power system oscillations, the damping device controller comprising:
a plurality of outer closed loop paths each including an adaptive controller configured to determine an individual oscillation mode from at least one power system measurement signal, and to generate an adaptive control signal to shift at least one open loop pole of an inner loop path related to the individual oscillation mode to a closed loop location;
a delay block associated with an output of the adaptive controller, the delay block configured to delay the generated adaptive control signal of the associative adaptive controller by a time sample with respect to a generated adaptive control signal of a previous adaptive controller;
summation means configured to generate a damping control signal by summation of the delayed adaptive control signals of each of the plurality of outer closed loop paths; and
a damping device to generate a damping signal based on the damping control signal.

2. The system of claim 1, wherein each additional adaptive control signal is superimposed with a Gaussian white noise before delaying by the sample time.

3. The system of claim 1, wherein the damping device includes automatic voltage regulator (AVR) or a flexible alternating current transmission system (FACTS) device.

4. The system of claim 1, wherein the power system measurement signal comprises a voltage signal, a current signal, a power signal, or a speed signal.

5. The system of claim 1, wherein the power system measurement signal comprises a remote power system measurement signals or a local power system measurement signal.

6. The system of claim 1, wherein the adaptive controller comprises an online estimator model for determining the individual oscillation mode from the power system measurement signal.

7. The system of claim 6, wherein the online estimator model comprises an auto regressive moving average model.

8. The system of claim 1, wherein the adaptive controller comprises a controller design module to determine controller parameters.

9. The system of claim 8, wherein the controller design module includes a pole shifting control algorithm to shift the open loop pole of the inner loop path by a pole shifting factor.

10. The system of claim 8, wherein the controller parameters are determined based on an equality equation comprising a closed loop characteristics equation.

11. The system of claim 1, wherein a number of the plurality of adaptive controllers is equal to a number of oscillation modes that need to be compensated for the power system oscillation damping.

12. A method of damping power system oscillations in a power system network, the method comprising:
obtaining a plurality of power system measurement signals from a plurality of power system locations;
generating a damping control signal to compensate for a plurality of oscillation modes in the power system oscillations, wherein generating the damping control signal comprises:
extracting an individual oscillation mode from each of the power system measurement signals;
generating a plurality of adaptive control signals to shift open loop poles related to the individual oscillation modes to a closed loop location;
delaying each generated adaptive control signal by a time sample with respect to a previous adaptive control signal;
generating a damping control signal by summation of the delayed adaptive control signals; and injecting a damping signal in the power system network based on the generated damping control signal.

13. The method of claim 12, wherein each additional adaptive control signal is superimposed with a Gaussian white noise before delaying by the sample time.

14. The method of claim 12, wherein injecting the damping signal includes utilizing an automatic voltage regulator (AVR) or a flexible alternating current transmission system (FACTS) device.

15. The method of claim 12, wherein the plurality of power system measurement signals comprises voltage signals, current signals, power signals, speed signals or combinations thereof.

16. The method of claim 12, wherein generating a plurality of adaptive control signals comprises utilizing a pole shifting control algorithm to shift the open loop poles related to the oscillation modes by a pole shifting factor.

17. The method of claim 16, wherein the pole shifting factor is determined based on an optimization function comprising minimizing an error between an expected output and a desired output.

18. The method of claim 12, wherein a number of the plurality of adaptive control signals is equal to a number of oscillation modes that need to be compensated for damping the power system oscillations.

* * * * *